(12) United States Patent
Sakai et al.

(10) Patent No.: US 11,460,105 B2
(45) Date of Patent: Oct. 4, 2022

(54) SHIFT DEVICE

(71) Applicant: AISIN CORPORATION, Kariya (JP)

(72) Inventors: Kosuke Sakai, Kariya (JP); Takashi Mizuno, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/207,887

(22) Filed: Mar. 22, 2021

(65) Prior Publication Data

US 2021/0388898 A1 Dec. 16, 2021

(30) Foreign Application Priority Data

Jun. 16, 2020 (JP) .............................. JP2020-103882

(51) Int. Cl.
*F16H 61/32* (2006.01)
*F16H 57/029* (2012.01)
(Continued)

(52) U.S. Cl.
CPC ........... *F16H 61/32* (2013.01); *F16H 57/029* (2013.01); *F16H 61/0006* (2013.01);
(Continued)

(58) Field of Classification Search
CPC .... F16H 61/32; F16H 57/029; F16H 61/0006; F16H 2057/02034; F16H 2061/247;
(Continued)

(56) References Cited

U.S. PATENT DOCUMENTS 7,291,951 B2 * 11/2007 Takiguchi .............. B60Q 1/076
310/67 R
8,957,559 B2 * 2/2015 Schneider ................ H02K 5/16
310/43
(Continued)

FOREIGN PATENT DOCUMENTS

JP 5648564 B2 1/2015
JP 5943955 B2 7/2016
(Continued)

OTHER PUBLICATIONS

The extended European Search Report dated Sep. 21, 2021, by the European Patent Office in corresponding European Patent Application No. 21164092.5-1012. (10 Pages).

*Primary Examiner* — Victor L MacArthur
(74) *Attorney, Agent, or Firm* — Buchanan Ingersoll & Rooney PC (57) ABSTRACT

A shift device includes: a shift switching member including valley portions corresponding to a shift position; and an actuator driving the shift switching member. The actuator includes a motor that includes a shaft, a control board that controls the motor, a driving force transmission mechanism that is connected to the shaft, and transmits a driving force to an output shaft from the motor, a housing and an outer lid that form a housing space housing the motor, the control board, and the driving force transmission mechanism, the outer lid covering an opening of the housing, and an inner lid that divides the housing space into a first space housing the motor and the control board, and a second space housing (Continued)

the driving force transmission mechanism, and is housed in the housing space, and the inner lid covers the entire control board with respect to the driving force transmission mechanism.

6 Claims, 6 Drawing Sheets (51) Int. Cl.
    *F16H 61/00*     (2006.01)
    *F16H 61/28*     (2006.01)
    *F16H 57/02*     (2012.01)
    *F16H 61/24*     (2006.01)
    *H02K 5/04*     (2006.01)
    *H02K 7/116*     (2006.01)

(52) U.S. Cl.
    CPC .............. *F16H 2057/02034* (2013.01); *F16H 2061/247* (2013.01); *F16H 2061/2892* (2013.01); *F16H 2061/326* (2013.01); *H02K 5/04* (2013.01); *H02K 7/116* (2013.01)

(58) Field of Classification Search
    CPC ....... F16H 2061/2892; F16H 2061/326; F16H 57/031; F16H 1/20; F16H 2057/02082; F16H 61/2807; H02K 5/04; H02K 7/116
    See application file for complete search history.

(56) References Cited

U.S. PATENT DOCUMENTS

| | | | |
|---|---|---|---|
| 9,112,438 | B2 | 8/2015 | Semura et al. |
| 9,234,581 | B2 | 1/2016 | Nagahori et al. |
| 9,951,866 | B2 | 4/2018 | Kuwahara et al. |
| 10,371,257 | B2 * | 8/2019 | Kume .................... H02K 11/33 |
| 10,763,725 | B2 | 9/2020 | Saito et al. |
| 2010/0170355 | A1 * | 7/2010 | Kume .................... F16H 61/32 |
| | | | 29/428 |
| 2012/0255385 | A1 * | 10/2012 | Nakayama ............ F16H 19/001 |
| | | | 74/437 |
| 2021/0388899 | A1 | 3/2021 | Sakai et al. |

FOREIGN PATENT DOCUMENTS

| | | |
|---|---|---|
| JP | 6455059 B2 | 1/2019 |
| JP | 2019187159 A | 10/2019 |
| WO | 2016017417 A1 | 2/2016 |

\* cited by examiner

SHIFT DEVICE

CROSS REFERENCE TO RELATED APPLICATIONS

This application is based on and claims priority under 35 U.S.C. § 119 to Japanese Patent Application No. 2020-103882, filed on Jun. 16, 2020, the entire content of which is incorporated herein by reference.

TECHNICAL FIELD

This disclosure generally relates to a shift device, and particularly to a shift device including a shift switching member including a plurality of valley portions corresponding to a shift position.

BACKGROUND DISCUSSION

In the related art, a shift device including a shift switching member including a plurality of valley portions corresponding to a shift position is known (see, for example, Japanese Patent No. 5943955).

Japanese Patent No. 5943955 discloses a range switching mechanism (shift device) including a detent plate (shift switching member) including a plurality of valley portions corresponding to a shift position. The range switching mechanism includes a range switching device that revolves the detent plate. The range switching device includes a motor, a control board for controlling the motor, a reduction mechanism, and a front body and a rear body. The motor, the control board, and the reduction mechanism are housed inside the front body and the rear body.

The range switching device of Japanese Patent No. 5943955 includes a dust-proof wall disposed between the reduction mechanism and the control board inside the front body and the rear body. The dust-proof wall is provided so as to cover a part of the control board with respect to the reduction mechanism.

However, in the range switching mechanism of Japanese Patent No. 5943955, the dust-proof wall is provided so as to cover a part of the control board with respect to the reduction mechanism as described above. Therefore, a part of the control board is exposed when seen from the reduction mechanism side. For this reason, in the range switching mechanism of Japanese Patent No. 5943955, there is a problem that the dust-proof wall (inner lid) cannot sufficiently prevent metal wear powder caused by wear of the reduction mechanism (driving force transmission mechanism) from adhering to the control board.

A need thus exists for a shift device which is not susceptible to the drawback mentioned above.

SUMMARY

According to an aspect of the present disclosure, there is a shift device including: a shift switching member that includes a plurality of valley portions corresponding to a shift position; and an actuator that drives the shift switching member, in which the actuator includes a motor that includes a shaft, a control board that controls the motor, a driving force transmission mechanism that is connected to the shaft, and transmits a driving force to an output shaft from the motor, a housing and an outer lid that form a housing space housing the motor, the control board, and the driving force transmission mechanism, the outer lid covering an opening of the housing, and an inner lid that divides the housing space into a first space housing the motor and the control board, and a second space housing the driving force transmission mechanism, and is housed in the housing space, and the inner lid covers the entire control board with respect to the driving force transmission mechanism.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments of the disclosure will be described with reference to the drawings.

A configuration of a shift device 100 mounted on a vehicle such as an electric vehicle will be described with reference to FIGS. 1 to 7D.

Figure 1:
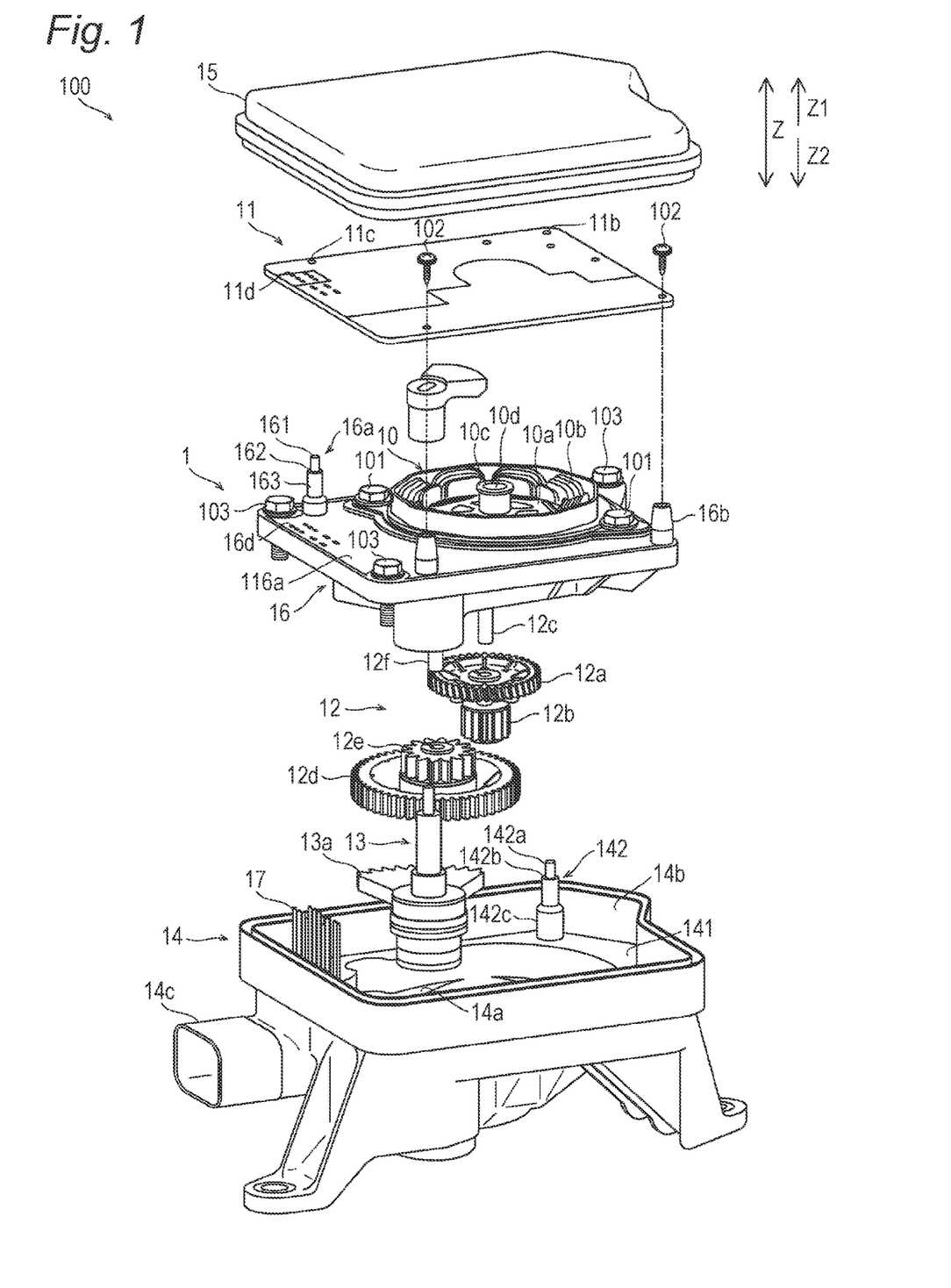
FIG. 1 is an exploded perspective view of a shift device according to an embodiment.
Figure 2:
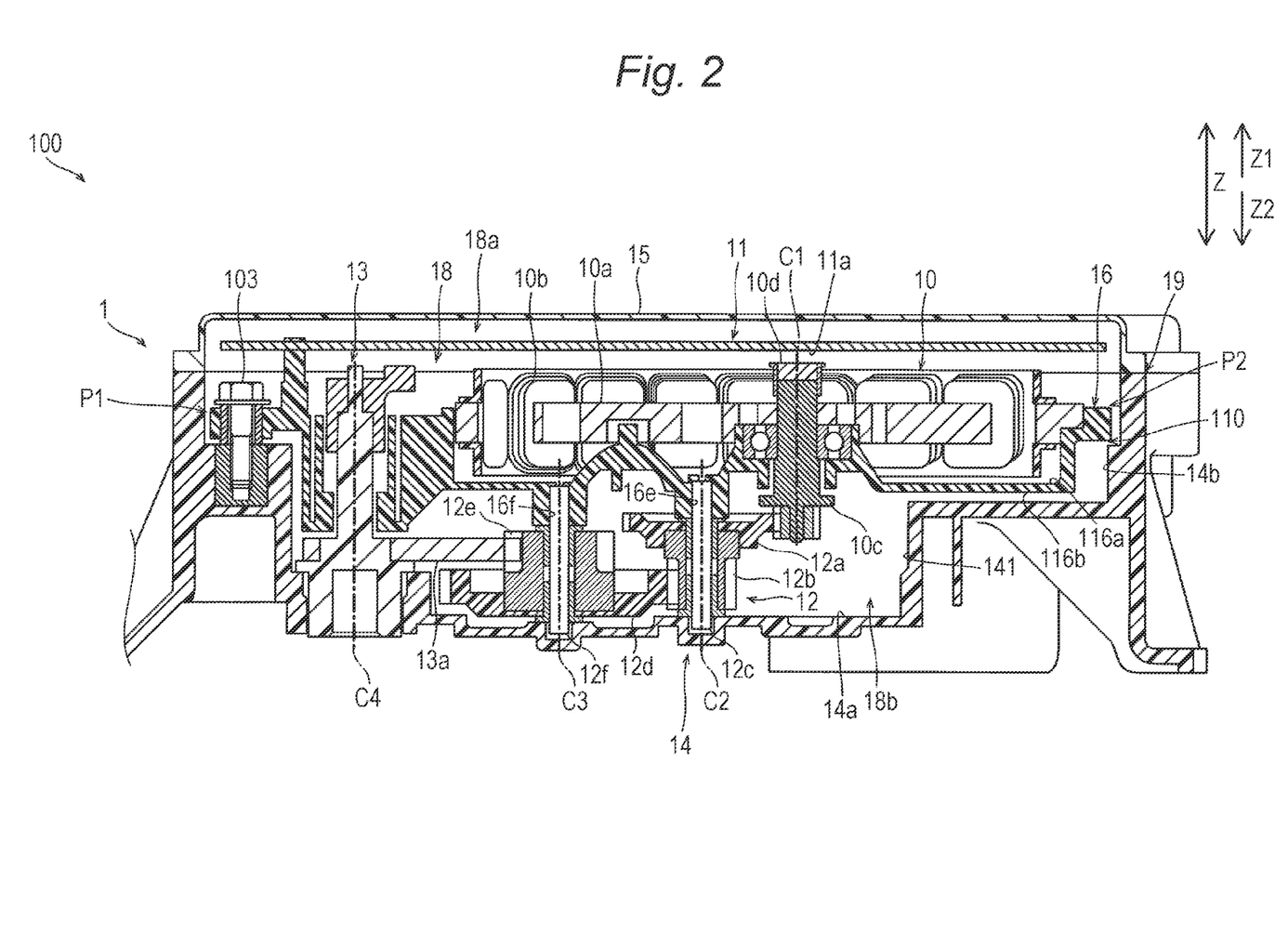
FIG. 2 is a cross-sectional view of a shift device according to the embodiment.

As illustrated in FIGS. 1 and 2, in a vehicle, when an occupant (driver) performs a shift switching operation by using an operation unit such as a shift lever (or shift switch), an electric shift switching control is performed on a transmission mechanism portion. That is, a position of the shift lever is input to the shift device 100 via a shift sensor provided in the operation unit. Then, based on a control signal transmitted from a dedicated control board 11 provided in the shift device 100, the transmission mechanism portion is switched to any shift position of a P (parking) position, a R (reverse) position, an N (neutral) position and a D (drive) position, which are corresponding to the shift operation of the occupant. Such a shift switching control is referred to as shift-by-wire. Each of the P, R, N, and D positions is an example of the "shift position" in the claims.

Figure 5:
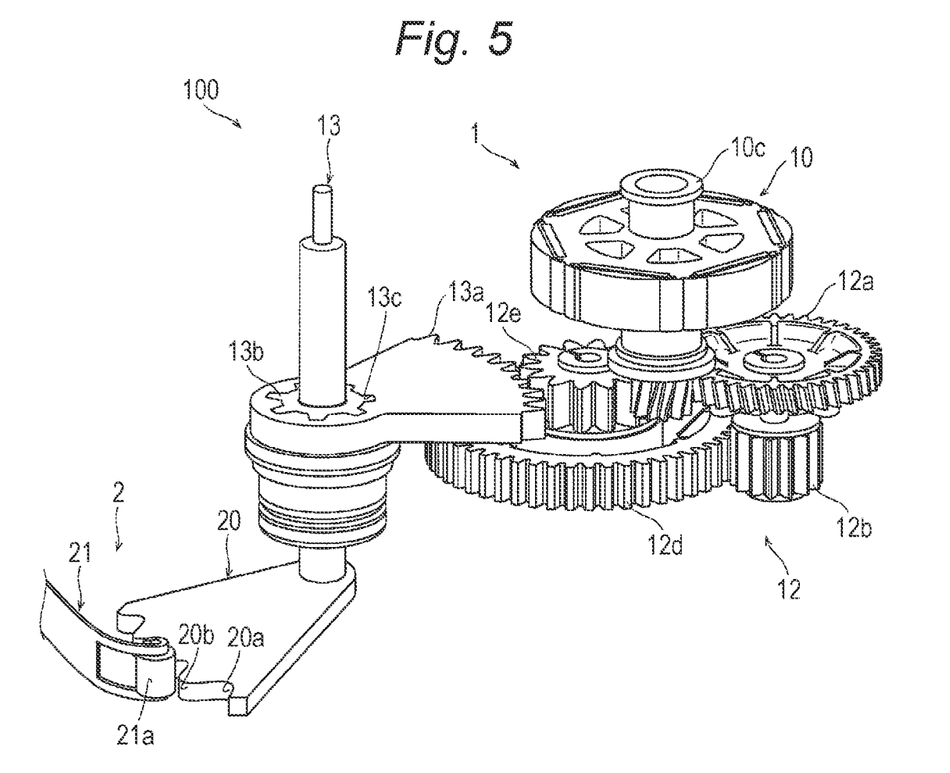
FIG. 5 is a perspective view illustrating a connection between a driving force transmission mechanism and a driving side member of a shift device according to the embodiment.

The shift device 100 includes an actuator 1 and a shift switching mechanism 2 (see FIG. 5) including a shift switching member 20 (see FIG. 5).

The actuator 1 is a driving device that drives the shift switching member 20 based on a shift switching operation of the occupant (driver). The actuator 1 includes a motor 10, a control board 11, a driving force transmission mechanism 12, an output shaft 13, a housing 14, an outer lid 15, an inner lid 16, and a connection terminal 17.

The motor 10 is an interior permanent magnet (IPM) three-phase brushless motor. The motor 10 is fixed to the inner lid 16 by a fastening member 101.

The motor 10 includes a rotor 10a, a stator 10b, a shaft 10c, and a magnet 10d. Here, a direction in which the shaft 10c extends is a Z direction, the outer lid 15 side in the Z direction is a Z1 direction, and the housing 14 side in the Z direction is a Z2 direction.

In the rotor 10a, an N-pole magnet and an S-pole magnet, as a permanent magnet, are alternately embedded around a rotation axis C1 of the shaft 10c at an equal angle interval. The stator 10b has a plurality of phases (U phase, V phase and W phase) of excitation coils that generate a magnetic force by applying a current. The shaft 10c is configured to rotate around the rotation axis C1 together with the rotor 10a. The shaft 10c is rotatably supported by the inner lid 16. The magnet 10d is attached to the shaft 10c to detect a rotation angle position of the shaft 10c. The magnet 10d is disposed in an end of the shaft 10c on the Z1 direction side (one side).

The control board 11 is configured to control the motor 10. The control board 11 is a board component in which electronic components are mounted on a board. The control board 11 is fixed to the inner lid 16 by a fastening member 102. On the control board 11, a rotation angle sensor 11a is disposed in a position facing the magnet 10d in a direction in which the shaft 10c extends. The rotation angle sensor 11a is a sensor that detects an amount of rotation (rotation angle) of the shaft 10c by the magnet 10d attached to the shaft 10c. The rotation angle sensor 11a is disposed in a position facing the magnet 10d in the Z direction. That is, the magnet 10d and the rotation angle sensor 11a are disposed on the rotation axis C1 of the shaft 10c with a predetermined gap.

The control board 11 includes an insertion hole 11b, an insertion hole 11c, and a plurality of fitting holes 11d. The insertion hole 11b, the insertion hole 11c, and the plurality of fitting holes 11d are through holes that penetrate the board in the Z direction. A tip of the connection terminal 17 on the Z1 direction side is inserted and fitted into each of the plurality of fitting holes 11d.

The driving force transmission mechanism 12 is connected to the shaft 10c and is configured to transmit a driving force from the motor 10 to the output shaft 13. Here, the driving force transmission mechanism 12 is configured as a reduction mechanism unit. The driving force transmission mechanism 12 includes a gear 12a, a gear 12b, a shaft portion 12c, a gear 12d, a gear 12e, and a shaft portion 12f.

The gear 12a and the gear 12b are rotated by the driving force from the motor 10. The gear 12a is a large-diameter gear attached to the shaft portion 12c on the Z1 direction side. The gear 12a is made of a resin. The gear 12b is a small-diameter gear attached to the shaft portion 12c on the Z2 direction side. The gear 12b is made of metal. The shaft portion 12c has a rotation axis C2 parallel to the Z direction. The shaft portion 12c rotatably supports the gear 12a and the gear 12b. An end of the shaft portion 12c on the Z1 direction side is rotatably supported by the inner lid 16. An end of the shaft portion 12c on the Z2 direction side is rotatably supported by the housing 14.

The gear 12d and the gear 12e are rotated by the driving force from the motor 10. The gear 12d is a large-diameter gear attached to the shaft portion 12f on the Z2 direction side. The gear 12d is made of a resin. The gear 12e is a small-diameter gear attached to the shaft portion 12f on the Z1 direction side. The gear 12e is made of metal. The shaft portion 12f has a rotation axis C3 parallel to the Z direction. The shaft portion 12f rotatably supports the gear 12d and the gear 12e. An end of the shaft portion 12f on the Z1 direction side is rotatably supported by the inner lid 16. An end of the shaft portion 12f on the Z2 direction side is rotatably supported by the housing 14.

The output shaft 13 is configured to output the driving force of the motor 10 to the shift switching member 20 (see FIG. 5). The output shaft 13 extends in the Z direction. The output shaft 13 is connected to the output side of the driving force transmission mechanism 12. The output shaft 13 is connected to the input side of the shift switching member 20. The output shaft 13 has a rotation axis C4 parallel to the Z direction. The output shaft 13 is rotatably supported by the inner lid 16 and the housing 14.

(Housing and Outer Lid)

The housing 14 and the outer lid 15 form a housing space 18 that houses the motor 10, the control board 11, and the driving force transmission mechanism 12. The housing space 18 is an internal space formed of the housing 14 and the outer lid 15.

The housing 14 is disposed on the Z2 direction side. The housing 14 has a recessed shape in which a surface on the Z1 direction side is recessed in the Z2 direction. Specifically, the housing 14 includes an inner bottom surface 14a, an inner side surface 14b extending from the inner bottom surface 14a, and a socket portion 14c. The inner bottom surface 14a is a recessed bottom surface formed on the surface of the housing 14 on the Z1 direction side. The inner side surface 14b is a side surface extending in the Z1 direction from an edge of the inner bottom surface 14a.

The inner side surface 14b includes a protrusion portion 141 and a positioning protrusion portion 142. The protrusion portion 141 protrudes from a portion of the inner side surface 14b on the Z2 direction side toward a center side of the housing 14. As described above, the protrusion portion 141 is a stepped portion. The positioning protrusion portion 142 protrudes in the Z1 direction from the surface of the protrusion portion 141 on the Z1 direction side. The positioning protrusion portion 142 has a substantially truncated cone shape.

The positioning protrusion portion 142 includes a small-diameter portion 142a, a mounting surface 142b, and a large-diameter portion 142c. The small-diameter portion 142a is provided on a portion of the protrusion portion 141 on the Z1 direction side. The small-diameter portion 142a has a diameter smaller than that of the large-diameter portion 142c in a direction orthogonal to the Z direction. The small-diameter portion 142a is inserted into the insertion hole 11b of the control board 11. Accordingly, the positioning protrusion portion 142 positions the control board 11 in a direction orthogonal to the Z direction. The mounting surface 142b is provided at a boundary portion between the small-diameter portion 142a and the large-diameter portion 142c. The mounting surface 142b is a surface extending in a direction orthogonal to the Z direction. The control board 11 in which the small-diameter portion 142a is inserted into the insertion hole 11b is mounted on the mounting surface 142b. Accordingly, the positioning protrusion portion 142 positions the control board 11 in the Z direction. The large-diameter portion 142c has a diameter larger than that of the small-diameter portion 142a in a direction orthogonal to the Z direction.

The socket portion 14c is configured into which a wiring cable (not shown) for mutual communication between a control device as an external device and the control board 11 can be inserted. The socket portion 14c is provided on an outer side surface of the housing 14. The socket portion 14c includes an insertion hole into which the wiring cable is inserted. The wiring cable also has a function of supplying electric power to the control board 11.

The outer lid 15 is disposed on the Z1 direction side. The outer lid 15 has a recessed shape in which the surface on the Z2 direction side is recessed in the Z1 direction. The outer lid 15 is a cover that covers the housing 14 from the Z1 direction side.

The housing 14 and the outer lid 15 are resin members. The housing 14 and the outer lid 15 are bonded by welding. That is, a welded portion 19 is provided between the outer lid 15 and the housing 14 to prevent a foreign substance from entering the housing space 18 surrounded by the outer lid 15 and the housing 14. The welded portion 19 is a portion in which an edge of the housing 14 on the Z1 direction side and an edge of the outer lid 15 on the Z2 direction side are welded to each other.

(Inner Lid)

As illustrated in FIGS. 1 and 2, the inner lid 16 of the present embodiment covers the entire control board 11 with respect to the driving force transmission mechanism 12. That is, the inner lid 16 is housed in the housing space 18, and is disposed between the driving force transmission mechanism 12 and the control board 11. The inner lid 16 covers the driving force transmission mechanism 12 from the Z1 direction side. Specifically, the inner lid 16 covers the gear 12a, the gear 12b, the gear 12d, and the gear 12e from the Z1 direction side.

The inner lid 16 is a resin member extending in a direction orthogonal to the Z direction. The inner lid 16 extends from a vicinity P1 of one inner side surface 14b to a vicinity P2 of the other inner side surface 14b of the housing 14 in a cross section in the Z direction (direction in which the shaft 10c extends). The inner lid 16 is attached to the housing 14 in a state in which the inner lid 16 is mounted on the protrusion portion 141. The vicinity P1 and vicinity P2 of the inner side surface 14b are broad concepts including a position which is slightly distant from the inner side surface 14b and a position which is in contact with the inner side surface 14b.

The inner lid 16 divides the housing space 18 into a first space 18a that houses the motor 10 and the control board 11 and a second space 18b that houses the driving force transmission mechanism 12, and is housed in the housing space 18.

The first space 18a is a space of the housing space 18 on the Z1 direction side. The first space 18a is formed of a surface 116a of the inner lid 16 on the Z1 direction side, the inner side surface 14b of the housing 14, and the inner surface of the outer lid 15. The control board 11 and the motor 10 are disposed in the first space 18a. Specifically, the control board 11, and the rotor 10a and the stator 10b of the motor 10 are disposed in the first space 18a. In the Z direction (direction in which the outer lid 15 and the housing 14 are arranged), the control board 11 and the motor 10 are disposed in the first space 18a in this order from the Z1 direction side (outer lid 15 side).

The second space 18b is a space of the housing space 18 on the Z2 direction side. The second space 18b is formed of a surface 116b of the inner lid 16 on the Z2 direction side, the inner side surface 14b of the housing 14, and the inner bottom surface 14a of the housing 14. The driving force transmission mechanism 12 is disposed in the second space 18b.

Figure 3:
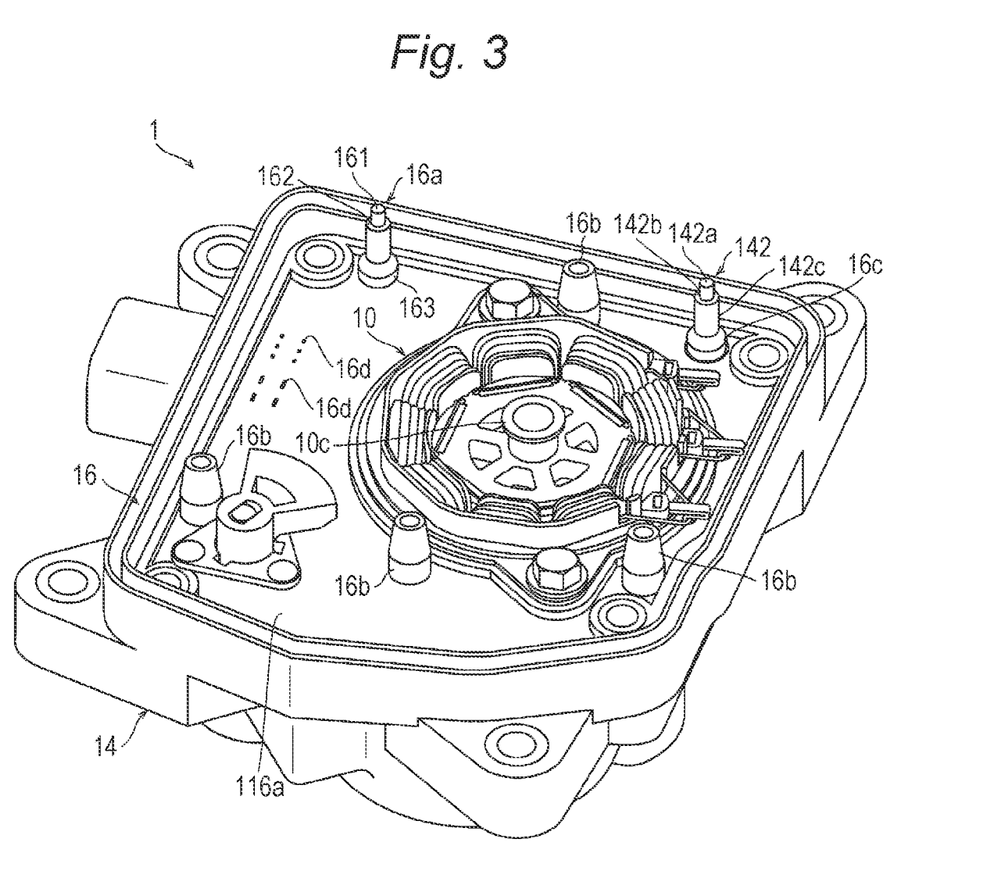
FIG. 3 is a perspective view of a state in which an outer lid of a shift device according to the embodiment is removed.

As illustrated in FIGS. 2 and 3, in the inner lid 16, at least the control board 11 is fixed to a surface 116a of the inner lid 16 on the Z1 direction side (surface on the outer lid 15 side). Here, the inner lid 16 includes a positioning protrusion portion 16a, a plurality of boss portions 16b, an insertion hole 16c, and a positioning hole 16d.

The positioning protrusion portion 16a protrudes in the Z1 direction from the surface 116a of the inner lid 16 on the Z1 direction side. The positioning protrusion portion 16a has a substantially truncated cone shape.

The positioning protrusion portion 16a includes a small-diameter portion 161, a mounting surface 162, and a large-diameter portion 163. The small-diameter portion 161 is provided on a portion of the positioning protrusion portion 16a on the Z1 direction side. The small-diameter portion 161 has a diameter smaller than that of the large-diameter portion 163 in a direction orthogonal to the Z direction. The small-diameter portion 161 is inserted into the insertion hole 11c of the control board 11. Accordingly, the positioning protrusion portion 16a positions the control board 11 in a direction orthogonal to the Z direction. The mounting surface 162 is provided at a boundary portion between the small-diameter portion 161 and the large-diameter portion 163. The mounting surface 162 is a surface extending in a direction orthogonal to the Z direction. The control board 11 in which the small-diameter portion 161 is inserted into the insertion hole 11c is mounted on the mounting surface 162. Accordingly, the positioning protrusion portion 16a positions the control board 11 in the Z direction. The large-diameter portion 163 has a diameter larger than that of the small-diameter portion 161 in a direction orthogonal to the Z direction.

The plurality of boss portions 16b protrudes in the Z1 direction from the surface 116a of the inner lid 16 on the Z1 direction side. The plurality of boss portions 16b has a substantially truncated cone shape. The control board 11 is mounted on a surface of each of the plurality of boss portions 16b on the Z1 direction side. Accordingly, the plurality of boss portions 16b position the control board 11 in the Z direction. A fastening hole is formed on a surface of each of the plurality of boss portions 16b on the Z1 direction side. A female screw portion is provided in the fastening hole. A fastening member 102 is screwed into the fastening hole. Accordingly, the control board 11 is fixed to the inner lid 16.

The insertion hole 16c is a through hole that penetrates the inner lid 16 in the Z direction. The insertion hole 16c is formed in accordance with an arrangement position of the positioning protrusion portion 142. The positioning protrusion portion 142 that positions the control board 11 is inserted into the insertion hole 16c. Specifically, the large-diameter portion 142c of the positioning protrusion portion 142 is inserted into the insertion hole 16c.

The positioning hole 16d is a through hole that penetrates the inner lid 16 in the Z direction. The positioning hole 16d is formed in accordance with an arrangement position of the connection terminal 17. The connection terminal 17 is inserted into the positioning hole 16d. Specifically, the connection terminal 17 is inserted into the positioning hole 16d, and the positioning hole 16d positions a tip of the connection terminal 17 on the control board 11 side. Accordingly, the tip of the connection terminal 17 is accurately inserted into the fitting hole 11d of the control board 11.

The motor 10 disposed in the first space 18a is fixed to the inner lid 16, and the shaft portion 12c and the shaft portion 12f of the driving force transmission mechanism 12 disposed in the second space 18b are fixed to the inner lid 16. Specifically, the inner lid 16 includes an attachment recessed portion 16e and an attachment recessed portion 16f. The attachment recessed portion 16e and the attachment recessed portion 16f are recessed in the Z1 direction with respect to the surface 116b of the inner lid 16 on the Z2 direction side. In a direction orthogonal to the Z direction, the attachment recessed portion 16e is disposed in a position closer to the shaft 10c of the motor 10 than the attachment recessed portion 16f. A portion of the shaft portion 12c on the Z1 direction side is rotatably inserted into the attachment recessed portion 16e. A portion of the shaft portion 12f on the Z1 direction side is rotatably inserted into the attachment recessed portion 16f.

The inner lid 16 is a resin member. The inner lid 16 is fixed to the housing 14 by a fastening member 103. The inner lid 16 and the housing 14 are bonded by welding. Here, a foreign substance entry prevention portion 110 that prevents a foreign substance from entering the first space 18a from the second space 18b housing the driving force transmission mechanism 12 is provided between the inner lid 16 and the protrusion portion 141 of the housing 14. The foreign substance entry prevention portion 110 includes a labyrinth structure portion. The foreign substance entry prevention portion 110 is provided in an end portion on the Z2 direction side in an edge of the inner lid 16.

Figure 4:
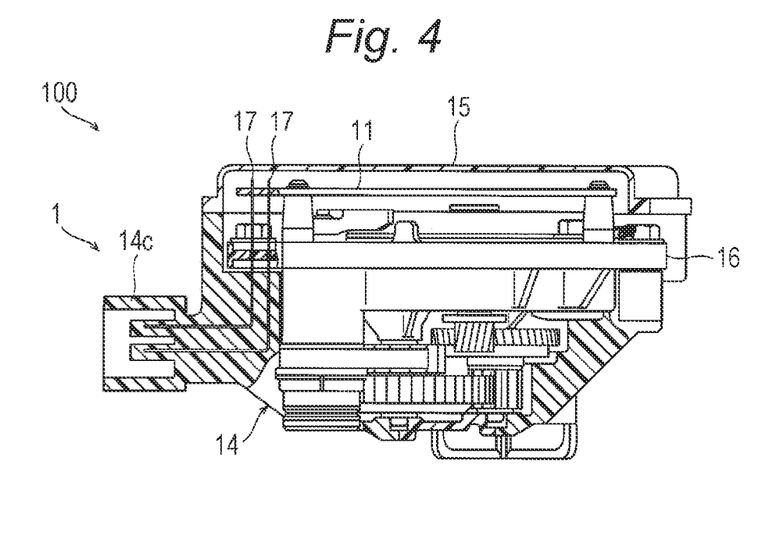
FIG. 4 is a cross-sectional view illustrating a socket portion of a shift device according to the embodiment.

As illustrated in FIG. 4, the connection terminal 17 connects the control device as an external device and the control board 11 via the inner lid 16. The connection terminal 17 is a bus bar that connects the control device and the control board 11. The connection terminal 17 is made of metal. In this way, the connection terminal 17 is electrically connected to the wiring cable to electrically connect the control device and the control board 11.

(Shift Switching Mechanism)

As illustrated in FIG. 5, the shift switching mechanism 2 is connected to a manual spool valve (not shown) of a hydraulic valve body in a hydraulic control circuit portion (not shown) of the transmission mechanism portion (not shown) and a parking mechanism portion (not shown). The transmission mechanism portion is configured so that the shift state (P position, R position, N position, and D position) is mechanically switched by driving the shift switching mechanism 2.

The shift switching mechanism 2 includes the shift switching member 20 and a positioning member 21 including a pin 21a. The shift switching member 20 is a detent plate. The shift switching member 20 includes a plurality of (four) valley portions 20a provided so as to correspond to the shift positions (P position, R position, N position and D position). The positioning member 21 is configured to establish a shift position in a state in which the pin 21a is fitted in any of a plurality of the valley portions 20a of the shift switching member 20 that is revolved by driving of the actuator 1. The positioning member 21 is a detent spring. The positioning member 21 is configured to hold the detent plate in revolution angle positions corresponding to the shift positions (P position, R position, N position, and D position).

Here, the output shaft 13 includes a driving side member 13a and a driven side member 13b.

The driving side member 13a is a fan-shaped gear. The driving side member 13a is connected to the output side of the driving force transmission mechanism 12. The driving side member 13a is engaged with the gear 12e. The driven side member 13b is a gear. The driven side member 13b is disposed in the driving side member 13a. The driven side member 13b is engaged with the driving side member 13a. The driven side member 13b is revolved in accordance with a revolution of the driving side member 13a.

Figure 6:
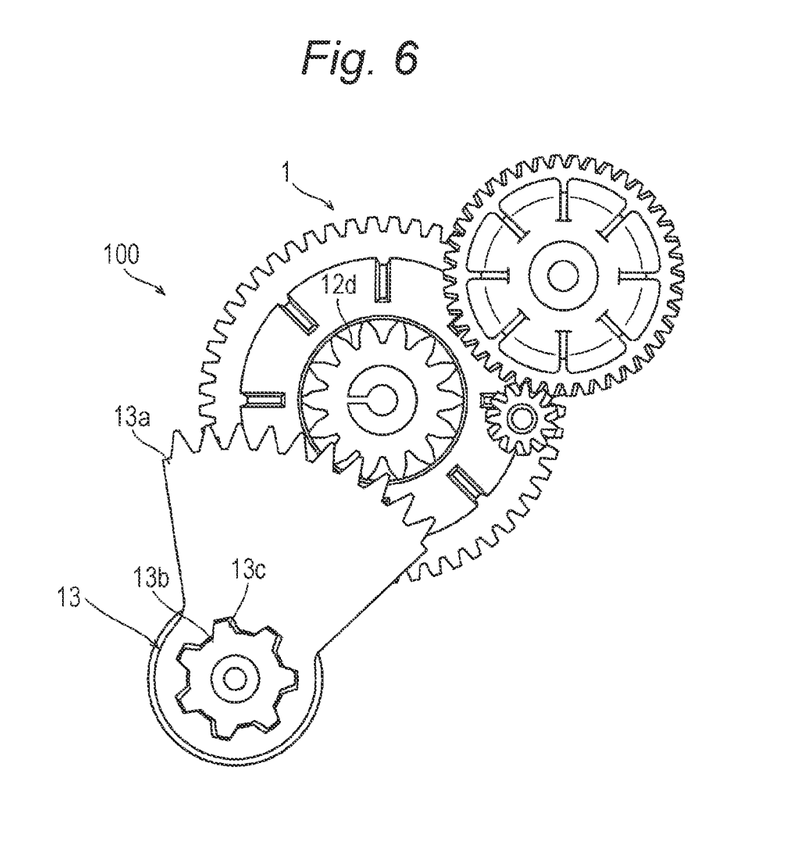
FIG. 6 is a plan view illustrating a connection between a driving force transmission mechanism and a driving side member of a shift device according to the embodiment.

As illustrated in FIG. 6, the shift device 100 is configured so that by providing a predetermined amount of backlash 13c between the driving side member 13a and the driven side member 13b, the driving side member 13a and the driven side member 13b can be relatively rotated by the predetermined amount of backlash 13c in the engaged state thereof. Accordingly, the shift switching member 20 is configured so as to rotate in accordance with a relative rotation corresponding to the predetermined amount of backlash 13c between the driving side member 13a and the driven side member 13b. The shift device 100 is configured to securely fit the pin 21a of the positioning member 21 into the valley portion 20a of the shift switching member 20 by using the predetermined amount of backlash 13c.

Figure 7A:
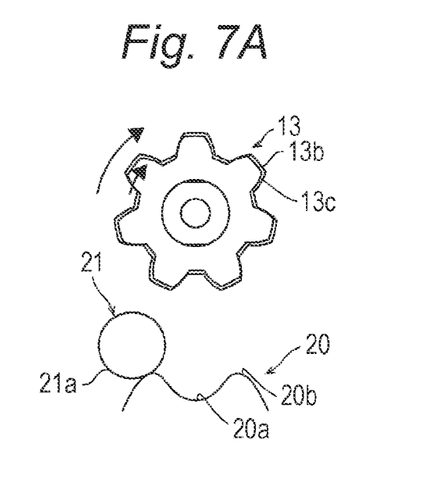
FIG. 7A is a schematic view illustrating a state before a pin of a positioning member goes over a mountain portion of a shift switching member.

That is, as illustrated in FIG. 7A, the motor 10 is driven to revolve the gear 12e, and the driving side member 13a is revolved, whereby the driving side member 13a moves by the predetermined amount of backlash 13c to be engaged with the driven side member 13b.

Accordingly, since the driven side member 13b revolves, the output shaft 13 is revolved. Then, as the output shaft 13 is revolved, the pin 21a of the positioning member 21 goes over the mountain portion 20b of the shift switching member 20.

Figure 7B:
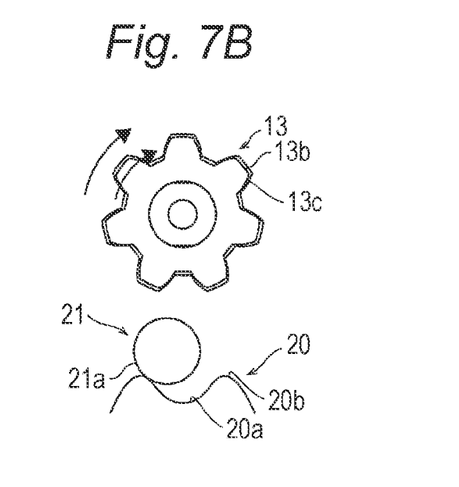
FIG. 7B is a schematic view illustrating a state after a pin of a positioning member goes over a mountain portion of a shift switching member.
Figure 7C:
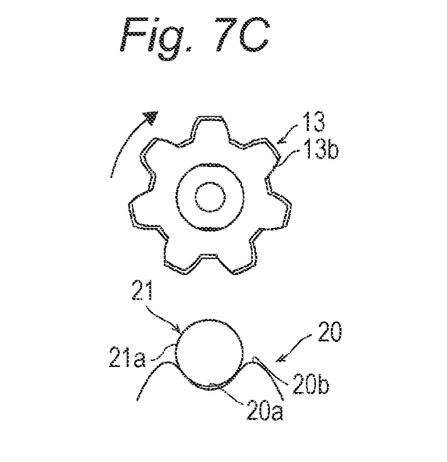
FIG. 7C is a schematic view illustrating a state in which a pin of a positioning member sits on a valley portion of a shift switching member.
Figure 7D:
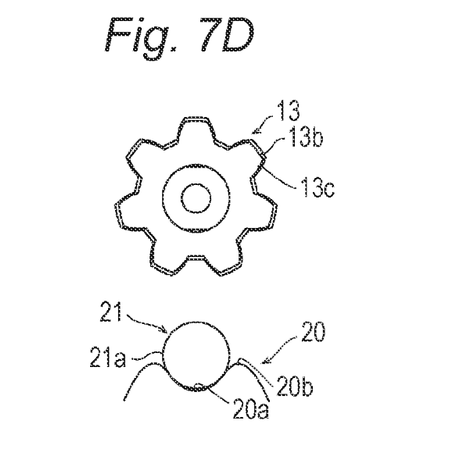
FIG. 7D is a schematic view illustrating a state in which a driving side member catches up with a driven side member.

At this time, as illustrated in FIG. 7B, the driven side member 13b is revolved prior to the revolution of the driving side member 13a when the pin 21a advances toward the valley portion 20a (suction force). Then, as illustrated in FIG. 7C, when the pin 21a sits on the valley portion 20a, the revolution of the driven side member 13b is stopped. Therefore, the revolution of the output shaft 13 is also stopped. Then, the driving side member 13a, which is revolved with a delay, is engaged with the driven side member 13b in the stopped state.

EFFECT OF EMBODIMENT

In the present embodiment, the following effects can be obtained.

In the present embodiment, as described above, the inner lid 16 is configured to cover the entire control board 11 with respect to the driving force transmission mechanism 12. Accordingly, when compared with the case in which the inner lid 16 covers only a part of the control board 11 with respect to the driving force transmission mechanism 12, the inner lid 16 can prevent metal wear powder caused by wear of the driving force transmission mechanism 12 from flying. Therefore, the metal wear powder can be sufficiently prevented from adhering to the control board 11.

In the present embodiment, as described above, the housing 14 includes the inner bottom surface 14a and the inner side surface 14b extending from the inner bottom surface 14a. The inner lid 16 extends from the vicinity P1 of one inner side surface 14b to the vicinity P2 of the other inner side surface 14b of the housing 14 in a cross section in the Z direction (direction in which the shaft 10c extends). Accordingly, since the inner lid 16 can more reliably block the metal wear powder, the metal wear powder can be more sufficiently prevented from adhering to the control board 11.

In the present embodiment, as described above, the protrusion portion 141 protruding toward the inside of the housing 14 is provided on the inner side surface 14b of the housing 14. The inner lid 16 is attached to the housing 14 in a state in which the inner lid 16 is mounted on the protrusion portion 141. Accordingly, since the inner lid 16 can be attached to the housing 14 in a state in which the inner lid 16 is mounted on the protrusion portion 141, the inner lid 16 can be easily attached to the housing 14.

In the present embodiment, as described above, the foreign substance entry prevention portion 110 that prevents a foreign substance from entering the first space 18a from the second space 18b housing the driving force transmission mechanism 12 is provided between the inner lid 16 and the protrusion portion 141 of the housing 14. Accordingly, since the foreign substance entry prevention portion 110 can prevent the metal wear powder from entering the first space 18a through the gap between the inner lid 16 and the protrusion portion 141 of the housing 14, the metal wear powder can be prevented from adhering to the control board 11.

In the present embodiment, as described above, in the inner lid 16, at least the control board 11 is fixed to the surface of the inner lid 16 on the outer lid 15 side. Accordingly, unlike the case in which the control board 11 is fixed to the outer lid 15, it is possible to prevent a shape of the inner surface of the outer lid 15 from being complicated. Therefore, a portion of the outer lid 15 (welding margin, and the like), which can be used for a connection with the housing 14, can be secured by the amount in which the complication of the outer lid 15 is prevented. As a result, the degree of freedom in a method for connecting the outer lid 15 with the housing 14 can be improved. That is, not only the outer lid 15 and the housing 14 can be connected via a sealing member, but also the outer lid 15 and the housing 14 can be connected by welding.

In the present embodiment, as described above, the magnet 10d disposed in the end of the shaft 10c on the Z1 direction side (one side) is provided in the motor 10. On the control board 11, the rotation angle sensor 11a is disposed in a position facing the magnet 10d in the Z direction (direction in which the shaft 10c extends). Accordingly, since a change in magnetic flux from the magnet 10d can always be measured by the rotation angle sensor 11a, resolution of measurement of the rotation angle of the shaft 10c by the rotation angle sensor 11a can be sufficiently secured.

According to an aspect of the present disclosure, there is a shift device including: a shift switching member that includes a plurality of valley portions corresponding to a shift position; and an actuator that drives the shift switching member, in which the actuator includes a motor that includes a shaft, a control board that controls the motor, a driving force transmission mechanism that is connected to the shaft, and transmits a driving force to an output shaft from the motor, a housing and an outer lid that form a housing space housing the motor, the control board, and the driving force transmission mechanism, the outer lid covering an opening of the housing, and an inner lid that divides the housing space into a first space housing the motor and the control board, and a second space housing the driving force transmission mechanism, and is housed in the housing space, and the inner lid covers the entire control board with respect to the driving force transmission mechanism.

In the shift device according to the aspect of the present disclosure, as described above, the inner lid covers the entire control board with respect to the driving force transmission mechanism. Accordingly, when compared with the case in which the inner lid covers only a part of the control board with respect to the driving force transmission mechanism, the inner lid can prevent metal wear powder caused by wear of the driving force transmission mechanism from flying. Therefore, the metal wear powder can be sufficiently prevented from adhering to the control board.

In the shift device according to the aspect of the present disclosure, it is preferable that the housing includes an inner bottom surface and an inner side surface extending from the inner bottom surface, and the inner lid extends from a vicinity of one inner side surface to a vicinity of the other inner side surface of the housing in a cross section in a direction in which the shaft extends. The vicinity of the inner side surface is a broad concept including a position which is slightly distant from the inner side surface and a position which is in contact with the inner side surface.

In this configuration, since the inner lid can more reliably block metal wear powder, the metal wear powder can be more sufficiently prevented from adhering to the control board.

In the shift device according to the aspect of the present disclosure, it is preferable that a protrusion portion protruding toward an inside of the housing is provided in an inner side surface of the housing, and the inner lid is attached to the housing in a state in which the inner lid is mounted on the protrusion portion.

In this configuration, since the inner lid can be attached to the housing in a state in which the inner lid is mounted on the protrusion portion, the inner lid can be easily attached to the housing.

In this case, it is preferable that a foreign substance entry prevention portion that prevents a foreign substance from entering the first space from the second space housing the driving force transmission mechanism is provided between the inner lid and the protrusion portion of the housing.

In this configuration, since the foreign substance entry prevention portion can prevent the metal wear powder from entering the first space through the gap between the inner lid and the protrusion portion of the housing, the metal wear powder can be prevented from adhering to the control board.

In the shift device according to the aspect of the present disclosure, it is preferable that at least the control board is fixed to a surface of the inner lid on the outer lid side.

In this configuration, unlike the case in which the control board is fixed to the outer lid, it is possible to prevent a shape of the inner surface of the outer lid from being complicated. Therefore, a portion of the outer lid (welding margin, and the like), which can be used for a connection with the housing, can be secured by the amount in which the complication of the outer lid is prevented. As a result, the degree of freedom in a method for connecting the outer lid with the housing can be improved. That is, not only the outer lid and the housing can be connected via a sealing member, but also the outer lid and the housing can be connected by welding.

In the shift device according to the aspect of the present disclosure, it is preferable that a magnet disposed in an end of the shaft on one side is provided in the motor, and on the control board, a rotation angle sensor is disposed in a position facing the magnet in a direction in which the shaft extends.

In this configuration, since a change in magnetic flux from the magnet can always be measured by the rotation angle sensor, resolution of measurement of the rotation angle of the shaft by the rotation angle sensor can be sufficiently secured.

MODIFICATION EXAMPLES

The embodiments disclosed herein should be considered to be examples in all aspects and not to be limited. The scope of the present disclosure is not a description of the embodiment described above but is indicated by the scope of claims, and further includes meanings equivalent to the scope of claims and all modifications (modification examples) within the scope of claims.

For example, in the present embodiment described above, it is described that the inner lid 16 is attached to the housing 14 in a state in which the inner lid 16 is mounted on the protrusion portion 141, but the present disclosure is not limited to this. In the present disclosure, the inner lid may be attached to the housing in which the protrusion portion is not provided.

In the above embodiment, it is described that the welded portion 19 is provided between the outer lid 15 and the housing 14, but the present disclosure is not limited to this. In the present disclosure, the outer lid and the housing may be attached to each other via the sealing member.

In the above embodiment, it is described that the foreign substance entry prevention portion 110 includes the labyrinth structure portion, but the present disclosure is not limited to this. In the present disclosure, the foreign substance entry prevention portion may include a sealing member.

In the above embodiment, it is described that the control board 11, the motor 10, and the driving force transmission mechanism 12 are fixed to the inner lid 16, but the present disclosure is not limited to this. In the present disclosure, only the control board may be fixed to the inner lid, and configurations other than the motor and the driving force transmission mechanism may be fixed to the inner lid.

In the above embodiment, it is described that the rotation angle sensor 11a is disposed in a position facing the magnet 10d disposed in the end of the shaft 10c of the motor 10 on the Z1 direction side, but the present disclosure is not limited to this. In the present disclosure, the rotation angle sensor may be disposed in a position facing the permanent magnet in the rotor.

In the above embodiment, it is described that the positioning protrusion portion 142 includes the mounting surface 142b, but the present disclosure is not limited to this. In the present disclosure, the positioning protrusion portion may not include the mounting surface.

In the above embodiment, it is described that the inner lid 16 includes the positioning hole 16d, but the present disclosure is not limited to this. In the present disclosure, the inner lid may include a through hole into which the connection terminal is inserted without positioning the connection terminal.

In the shift device according to the aspect of the present disclosure, the following configuration is also considered.

APPENDIX 1

That is, in the shift device in which the control board is fixed to the inner lid, the driving force transmission mechanism includes a gear that is rotated by a driving force from the motor and a shaft portion that rotatably supports the gear, the motor disposed in the first space is fixed to the inner lid, and the shaft portion of the driving force transmission mechanism disposed in the second space is fixed to the inner lid.

In this configuration, unlike the case in which the control board and the motor are fixed to the outer lid, it is possible to prevent a shape of the inner surface of the outer lid from being complicated. Unlike the case in which the driving force transmission mechanism is fixed only to the housing, it is possible to prevent a shape of the inner surface of the housing from being complicated. Accordingly, by the amount in which the complication of the outer lid and the housing is prevented, a portion of the outer lid (welding margin, and the like), which can be used for a connection with the housing, can be secured, and a portion of the housing (welding margin, and the like), which can be used for a connection with the outer lid, can be secured. As a result, the degree of freedom in a method for connecting the outer lid with the housing can be improved.

APPENDIX 2

In the shift device including the foreign substance entry prevention portion, the foreign substance entry prevention portion includes a labyrinth structure portion.

In this configuration, since the foreign substance entry prevention portion can be realized without using the sealing member, an increase in the number of components can be suppressed as compared with the case in which the foreign substance entry prevention portion is realized by using the sealing member. As compared with the case in which the foreign substance entry prevention portion is realized by using the sealing member, the inner lid can be easily attached to the housing.

APPENDIX 3

In the shift device according to the aspect of the present disclosure, it is preferable that a welded portion is provided between the outer lid and the housing to prevent a foreign substance from entering the housing space surrounded by the outer lid and the housing.

In this configuration, since a portion between the outer lid and the housing can be sealed without using the sealing member, an increase in the number of components can be suppressed as compared with the case in which a portion between the outer lid and the housing is sealed by using the sealing member. As compared with the case in which the outer lid and the housing can be connected via the sealing member, the outer lid and the housing can be easily connected.

APPENDIX 4

In the shift device according to the aspect of the present disclosure, in a direction in which the outer lid and the housing are arranged, the control board and the motor are disposed in the first space in this order from the outer lid side.

In this configuration, since a sensor that measures the rotation angle of the shaft can be disposed in a position on the control board, the position corresponding to the rotation axis of the shaft of the motor, the change in the rotation angle of the shaft can be always measured by the sensor. As a result, resolution of measurement of the rotation angle of the shaft by the sensor can be sufficiently secured.

APPENDIX 5

According to the aspect of the present disclosure, it is preferable that the shift device further includes a connection terminal that connects an external device and the control board via the inner lid, in which the inner lid includes a positioning hole into which the connection terminal is inserted and which positions a tip of the connection terminal on the control board side.

In this configuration, since the tip of the connection terminal can be connected to the control board in a state in which the tip of the connection terminal is positioned in the positioning hole, the connection terminal can be easily connected to the control board.

APPENDIX 6

According to the aspect of the present disclosure, it is preferable that the shift device further includes a positioning member that establish a shift position in a state in which a pin is fitted in any of a plurality of the valley portions of the shift switching member that is revolved by driving of the actuator, in which the output shaft includes a driving side member that is connected to an output side of the driving force transmission mechanism and a driven side member that is revolved in accordance with a revolution of the driving side member, the output shaft configured so that by providing a predetermined amount of backlash between the driving side member and the driven side member, the driving side member and the driven side member can be relatively rotated by the predetermined amount of backlash in the engaged state thereof, and the shift switching member is configured so as to be rotated in accordance with a relative rotation corresponding to the predetermined amount of backlash between the driving side member and the driven side member.

In this configuration, when the positioning member goes over a mountain portion of the shift switching member toward the valley portion, the driven side member can be revolved prior to the revolution of the driving side member by the predetermined amount of backlash between the driving side member and the driven side member. As a result, since the positioning member can be seated on the valley portion of the shift switching member regardless of the revolution of the driving side member, the positioning member can be reliably seated on the valley portion of the shift switching member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shift device comprising:
a shift switching member that includes a plurality of valley portions each corresponding to a different shift position; and
an actuator that drives the shift switching member,
wherein the actuator includes
a motor that includes a shaft,
a control board that controls the motor,
a driving force transmission mechanism that is connected to the shaft, and transmits a driving force to an output shaft from the motor,
a housing and an outer lid that engage with each other to form a housing space housing the motor, the control board, and the driving force transmission mechanism, the outer lid covering an opening of the housing, and
an inner lid that 1) divides the housing space into a first space housing the motor and the control board, and a second space housing the driving force transmission mechanism, and 2) is housed entirely in the housing space, and
the inner lid covers the entire control board with respect to the driving force transmission mechanism.

2. The shift device according to claim 1, wherein
the housing includes an inner bottom surface and first and second inner side surfaces extending from the inner bottom surface, and
the inner lid extends from a vicinity of the first inner side surface to a vicinity of the second inner side surface of the housing in a cross section in a direction in which the shaft extends.

3. The shift device according to claim 1, wherein
a protrusion portion protruding toward an inside of the housing is provided in an inner side surface of the housing, and
the inner lid is attached to the housing in a state in which the inner lid is mounted on the protrusion portion.

4. The shift device according to claim 3, wherein a foreign substance entry prevention portion that prevents a foreign substance from entering the first space from the second space housing the driving force transmission mechanism is provided between the inner lid and the protrusion portion of the housing.

5. The shift device according to any one of claim 1, wherein at least the control board is fixed to a surface of the inner lid on the outer lid side.

6. The shift device according to any one of claim 1, wherein a magnet disposed in an end of the shaft of the motor on one side is provided in the motor, and
on the control board, a rotation angle sensor is disposed in a position facing the magnet in a direction in which the shaft extends.

* * * * *